Feb. 24, 1953  J. D. RUST  2,629,221
COTTON STRIPPING COMB
Original Filed Feb. 24, 1947  2 SHEETS—SHEET 1
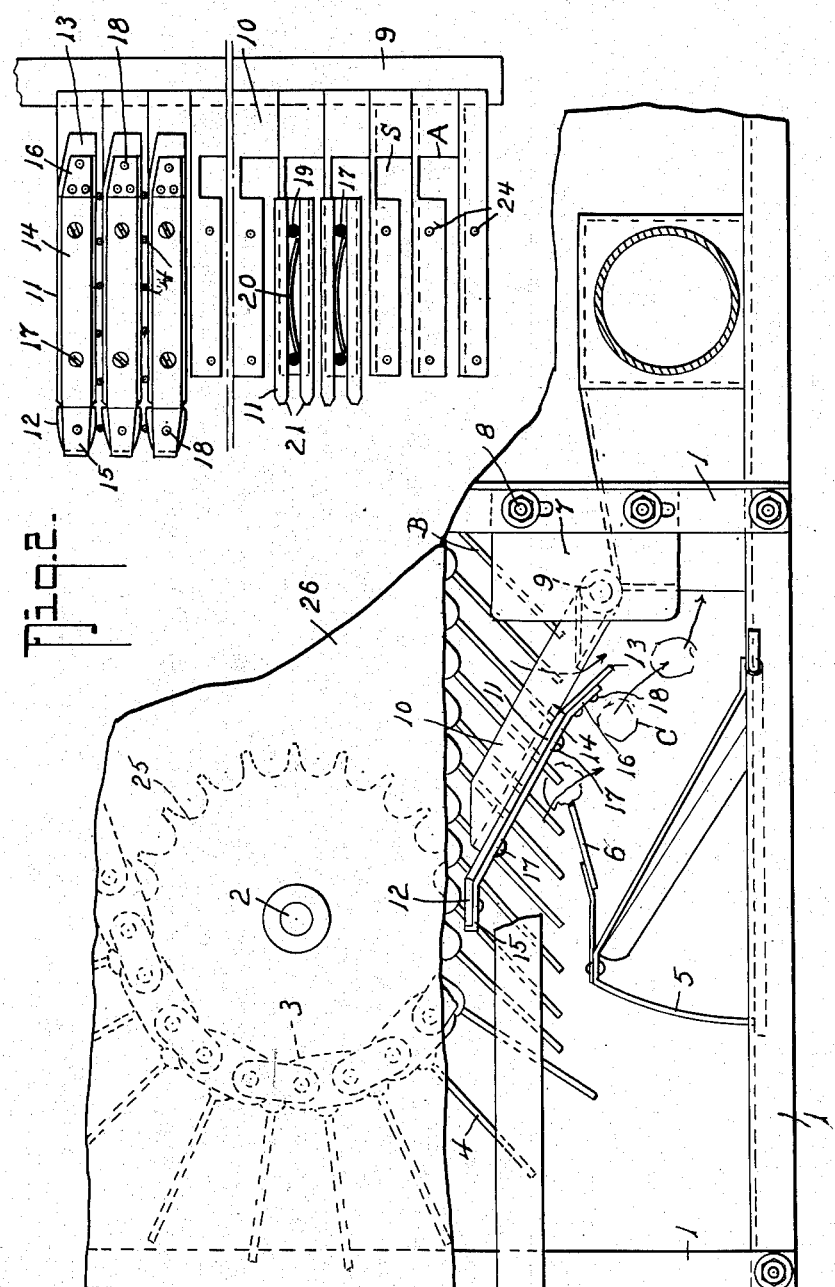
Inventor,
John D. Rust,
By Albert E. Dieterich,
ATTORNEY.

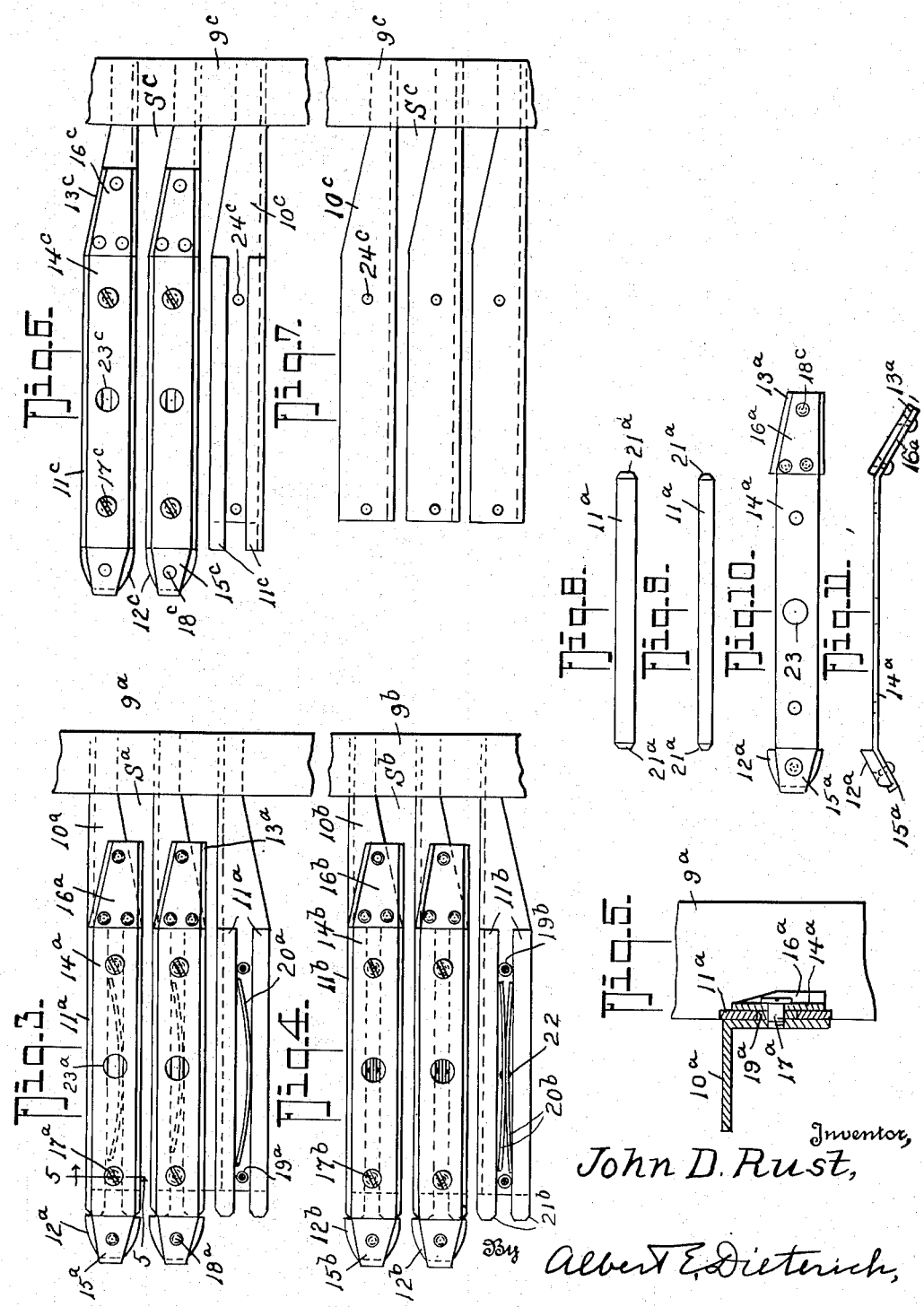

Patented Feb. 24, 1953

2,629,221

UNITED STATES PATENT OFFICE 2,629,221

COTTON STRIPPING COMB

John D. Rust, Pine Bluff, Ark.

Original application February 24, 1947, Serial No. 730,437. Divided and this application September 22, 1949, Serial No. 117,092

11 Claims. (Cl. 56—41)

The present invention relates to cotton picking machines which employ stripping combs for removing cotton from the picking spindles—such machines as the machines of the Rust type, for examples.

Objects of the invention are to provide:

1. A stripping comb in which the stripping bars are automatically held in contact with the spindles by spring action.

2. A stripping comb whose stripping bars may be securely clamped in position when adjusted.

3. In a stripping comb at the delivery end of the stripping bars, the widest possible air vent through which air can be drawn to the suction nozzle by the suction mechanism of a cotton picking machine to help insure effective delivery of the cotton from the tips of the spindles.

4. Combination stripping bar stops and cotton deflectors at the delivery ends of the stripping bars of the stripping comb which will hold the stripping bars against longitudinal movement and will guide the cotton away from the ends of the spindles into the air stream flowing through the adjacent rib opening or vents, into the suction nozzle where it will be delivered to a receptacle.

5. A combination spindle entering guide and stripping bar retainer.

Other objects will in part be obvious and in part will be pointed out hereinafter.

To the attainment of the aforesaid objects and ends, invention still further resides in the novel details of construction, combination and arrangement of parts, all of which will be first fully described in the following detailed description, and then be particularly pointed out in the appended claims, reference being had to the accompanying drawings in which:

Fig. 1 is a top plan view of a portion of a Rust cotton picking machine embodying my invention, parts being broken away and the suction uptake duct being shown in section.

Fig. 2 is a detailed elevation on an enlarged scale of a spindle stripping comb embodying one form of my invention, parts being omitted on several of the ribs for convenience of illustration.

Fig. 3 is a detailed elevation on an enlarged scale of a portion of a spindle stripping comb showing another embodiment of the invention.

Fig. 4 is a view similar to Fig. 3 showing a further modification.

Fig. 5 is an enlarged cross section on the line 5—5 of Fig. 3.

Fig. 6 is a view similar to Figs. 3 and 4, showing another modification of the invention.

Fig. 7 is an elevation of a portion of the comb showing the ribs of the embodiment of Fig. 6, with the parts supported by the same removed.

Fig. 8 is a detail elevation of a stripper bar.

Fig. 9 is an edgewise view of the same.

Fig. 10 is a detail elevation of one of the stripper bar holders.

Fig. 11 is an edgewise view of the same.

In the drawings, in which like numerals and letters of reference indicate like parts in all the figures, 1 represents the frame of the picker unit of the machine, 2 the conveyor shaft which carries a sprocket 25 of the endless slatted conveyor 3 having the spindles 4. The cover of the picker unit is designated by 26. The door to the suction chamber is indicated by the numeral 5, while 6 indicates the baffle plate. All of the foregoing parts, per se, constitute no part of the present invention.

Adjustably secured to a part of the frame, as at 8, are top and bottom plates 7 (the top plate only being shown). Welded, or otherwise fixedly secured, to the plates 7 is a post 9 having parallel ribs 10 which, in the embodiment shown in Fig. 2, contact one another adjacent the post 9 but are separated along the portion through which the spindles 4 are drawn (but in the embodiments shown in Figs. 3, 4, 6 and 7, the ribs are shown spaced apart from end to end).

On the ribs 10 are mounted the stripping bars 11 between which the cotton is stripped from the spindles.

In the embodients shown in Figs. 3 to 7, inclusive, the ribs $10^a$, $10^b$, $10^c$ respectively are sloped toward the posts $9^a$, $9^b$, $9^c$, respectively, from the point at which the spindles depart from the stripping bars, in order to provide a gradually widening space $S^a$, $S^b$, $S^c$, respectively between the ribs so as to avoid packing or clogging of cotton in the stripping mechanism.

In the embodiment shown in Fig. 2, the ribs 10 are provided with rectangular openings S, providing a vertical edge A, of which more will be said later. The ribs 10 have held to their outer faces by means of stripping bar holders 14, stripping bars 11 which act to strip the cotton from the spindles. Deflector blades (see 13, Fig. 2; $13^a$, Fig. 3; $13^b$, Fig. 4; and $13^c$, Fig. 6), cooperate with the stripping bars ($11$, $11^a$, $11^b$, $11^c$, as the case may be) in delivering the cotton to the suction chamber by deflecting the cotton removed by the stripper bars into the suction chamber as clearly shown in Figure 1. The deflector blades are held in place on the stripping bar holders ($14$, $14^a$, $14^b$, $14^c$, as the case may be) by rivets (18, 18ᵃ, 18ᵇ, 18ᶜ, as the case may be) or by other suitable means, and are positioned across the ends of the stripper bars as shown in Figures 1 to 4 and 6.

The parts are secured together by screws (17, 17ᵃ, 17ᵇ, 17ᶜ, as the case may be) that pass into the holes (24, Fig. 2; 24ᶜ, Figs. 6 and 7) in the stripping bar holders.

In the embodiment shown in Figs. 10 and 6 particularly, the stripping bar holders 14ᶜ are provided with holes 23, 23ᶜ respectively to provide an opening for adjusting the stripping bars to take up wear. The clamping screws are loosened and a screw driver is inserted through the hole and twisted to pry the bars apart.

One edge (preferably the top edge) of the extended end of the deflector blade (13, 13ᵃ, 13ᵇ, 13ᶜ, as the case may be) is beveled or inclined, as shown, to prevent the cotton from being retained by the said end after the spindles shall have been withdrawn. On the opposite end of the stripper bar holder (14, 14ᵃ, 14ᵇ, 14ᶜ, as the case may be) is secured a tapered element (12, 12ᵃ, 12ᵇ, 12ᶜ, as the case may be) which serves to guide the spindle into the proper path as it enters the stripping mechanism.

In the embodiments shown in Figs. 2 and 3, a single leaf spring (20, 20ᵃ, as the case may be) is located between the stripping bars, which spring continuously tends to force the bars (11, 11ᵃ, as the case may be) apart and to keep them in contact with the spindles, thus automatically compensating for the wear on the stripping bars and the spindles.

The entrant ends of the stripping bars are preferably beveled (as at 21, 21ᵃ, 21ᵇ, as the case may be) to facilitate the entrance of the spindles between the stripping bars.

In Fig. 4 I have shown a further modification in which two curved leaf springs 20ᵇ are secured back to back by a rivet 22 and located between a pair of stripping bars.

In the embodiments of the invention using springs (see Figs. 2, 3 and 4) spacers (19, 19ᵃ, 19ᵇ, as the case may be) are inserted between the stripping bars and between the ribs and the stripping bar holders to provide working clearance for the leaf springs and stripping bars. The screws (17, 17ᵃ, 17ᵇ, as the case may be) pass through the spacers. The stripping bars are held in position against longitudinal movement by the deflector plates and the tapered elements at the ends of the holders (14, etc.)

In the embodiment shown in Fig. 6, it was found that it was possible for a piece of cotton, grass, or the like, to hang on the spindle and be pulled past the deflector elements and lodged in the cracks of the stripping comb at the place where the angle bars join the vertical supporting bar or tube 9ᶜ. This deficiency is in part overcome by the embodiment shown in Figs. 3 and 4. However, I found that by constructing the comb as shown in Fig. 2, the deficiency was overcome completely, except for abnormal conditions. In this, the preferred embodiment, the ribs 10, at the ends that are welded to the vertical support 9, contact one another and are provided with rectangular openings S, providing a vertical edge A. It will be seen by reference to Figs. 1 and 2 that the spindle B has passed the dividing edge A.

The bulk of the cotton C gathered by the spindle was stripped from the spindle by the stripping bars and was held by the deflecting elements 13. Should a single strand of cotton cling to the spindle (B, Fig. 1), it will be pulled in two at edge A by the forward movement of the spindle. The cotton so held by the deflecting elements is now free to be drawn into the suction created by the air current, the path of which is indicated by the arrows in Fig. 1.

The square notch S, cut out of the stripping bar carrying ribs, serves the double purpose of providing an opening through which air is drawn by the suction fan that draws the cotton from the ends of the deflectors 13, and preventing clogging of the stripper comb, as has just been described above.

This application is a division of my application filed February 24, 1947, Ser. No. 730,437, now Patent No. 2,505,143, which was a continuation in part of my application filed October 15, 1946, Ser. No. 703,387, now abandoned.

From the foregoing description, taken in connection with the accompanying drawings, it is thought that the construction, operation and advantages of the invention will be clear to those skilled in the art.

What I claim is:

1. In a cotton picker having horizontal rows of picking spindles, a cotton stripping comb having a vertical support, a set of superposed ribs secured to said suport, a stripping bar holder secured to each rib in spaced parallel relation therewith, a pair of stripping bars floatably mounted between each of said holders and ribs, said stripping bars having entrant and delivery ends, said ribs being spaced apart to provide spindle passages in line with the stripping bars, a spring between the bars of each pair of stripping bars for yieldingly urging said bars against said spindles, said stripping bar holders extending beyond the entrant and delivery ends of the stripping bars, tapered spindle directing elements secured to the entrant end of said holders and tapered deflector blades secured to said holders and diverging outwardly at the delivery end of said stripping bars, each of said ribs adjacent said support and opposite said deflector blades having cutout portions defining air vent openings, said stripping bars being held against longitudinal movement by said deflector blades and said spindle directing elements.

2. In a cotton picking machine having horizontal rows of picking spindles, a cotton stripping comb having a vertical support, a set of superposed ribs secured to said support, an end portion of each of said ribs having an edge tapered towards said support and defining with respect to the subjacent rib an air vent opening, a stripping bar holder secured to each rib in spaced parallel relation therewith, a pair of stripping bars positioned between each of said holders and ribs, said stripping bars having entrant and delivery ends, said ribs having an edge arranged in spaced relation with a subjacent rib and defining a spindle passage terminating in said air vent opening, resilient means interposed between each pair of stripping bars for urging said bars into engagement with said spindles and means on said stripping bar holders adjacent the entrant and delivery ends of said stripping bars to retain said stripping bars against longitudinal movement.

3. In a cotton picking machine wherein stripping means is provided through which cotton picking spindles are drawn to free the cotton from the spindles, the improvement which includes a support, a plurality of superposed ribs secured to said support and spaced apart to permit passage of the spindles therebetween, a stripping bar holder mounted on each of said ribs in spaced parallel relation therewith, a pair of stripping bars floatably located between each of said ribs and holders, and means between the bars of each pair of stripping bars for continuously holding said bars in yielding contact with the spindles, and means carried by said holders for preventing longitudinal movement of the said stripping bars.

4. In a cotton picking machine wherein stripping means is provided through which cotton picking spindles are drawn to free the cotton from the spindles, the improvement which includes a supporting post, a set of superposed ribs secured to said support and spaced apart to permit passage of the spindles therebetween, a stripping bar holder secured to each rib in spaced parallel relation therewith, a pair of stripping bars positioned between each of said ribs and its cooperating holder, and resilient means positioned between the bars of each pair of stripping bars for continuously urging said bars in yielding contact with the spindles.

5. An improvement according to claim 4 wherein the entrant ends of said bars are beveled to enable the spindles to enter easily between adjacent stripping bars.

6. In a cotton picking machine of the type wherein stripping means is provided through which cotton picking spindles are drawn to free the cotton from the spindles, the improvement which comprises an upright support, a set of ribs secured to said support in vertical alignment, each of said ribs having an edge arranged in spaced relation with respect to the subjacent rib and defining a slot through which the spindles are drawn, each of said ribs having an opening therein adjacent said support and communicating with said slot, a stripper bar holder secured to each rib in spaced parallel relation therewith, a pair of stripper bars mounted between each rib and holder and resilient means interposed between each pair of stripper bars for maintaining contact between said stripper bars and the spindles.

7. A cotton stripping comb comprising a supporting post, a set of superposed ribs secured to said post, a stripping bar holder secured to each rib in spaced parallel relation therewith, stripping bars positioned between each of said holders and ribs, said ribs being spaced apart to provide spindle passages in line with the stripping bars, means securing said holders to said ribs, said holders extending beyond the ends of said stripping bars, tapered spindle directing elements secured to one end of said holders and outwardly diverging cotton deflector elements secured to the other end of said holders.

8. A cotton stripping comb comprising a supporting post, a set of superposed ribs secured to said post, a stripping bar holder secured to each rib in spaced parallel relation therewith, a pair of stripping bars positioned between each of said holders and ribs, the pairs of stripping bars having entrant and delivery ends and being spaced apart thereby providing picker spindle passages, said ribs having spindle passages in line with the passages between the pairs of stripping bars, screws securing said holders to said ribs, said holders extending beyond the entrant and delivery ends of said stripping bars, tapered spindle directing elements secured to said holders adjacent the entrant end of said stripping bars and outwardly diverging deflector elements secured to said holders adjacent the delivery end of said stripping bars, said ribs having rectangular cutouts opposite said deflector blades.

9. In a cotton picking machine wherein stripping means is provided through which cotton picking spindles are drawn to free the cotton from the spindles, the improvement which includes a plurality of superposed ribs spaced apart for passage of the spindles therebetween, a pair of stripping bars carried by each rib, said stripping bars having entrant and delivery ends, a cotton deflecting element carried by each of said ribs adjacent the delivery end of each pair of bars, said deflecting elements being so positioned to prevent longitudinal movement of said stripping bars in at least one direction.

10. In a cotton picking machine wherein stripping means is provided through which cotton picking spindles are drawn to free the cotton from the spindles, the improvement which includes a plurality of superposed ribs spaced apart for passage of the spindles therebetween, a pair of stripping bars carried by each rib, said stripping bars having entrant and delivery ends, means carried by each of said ribs adjacent the entrant end of stripping bars for guiding the spindles between the pairs of stripping bars, a cotton deflecting element carried by each of said ribs adjacent the delivery end of each pair of bars, said means and deflecting elements engaging the entrant and delivery ends respectively of said stripping bars to prevent longitudinal movement of said stripping bars.

11. In a cotton picking machine wherein stripping means is provided through which cotton picking spindles are drawn to free the cotton from the spindles, the improvement which includes a vertical support, a plurality of superposed ribs secured to said support, each of said ribs being formed with a reduced end portion adjacent said support and defining with respect to the subjacent rib an air vent opening, a pair of stripping bars carried by each rib, said stripping bars having entrant and delivery ends, said ribs having an edge arranged in spaced relation with a subjacent rib and defining a spindle passage terminating in said air vent opening, a cotton deflecting element carried by each of said ribs adjacent the delivery end of each pair of bars, said deflecting elements being so positioned to prevent longitudinal movement of said stripping bars in at least one direction.

JOHN D. RUST.

REFERENCES CITED

The following references are of record in the file of this patent:

UNITED STATES PATENTS

| Number | Name | Date |
| --- | --- | --- |
| 1,946,741 | Hamme et al. | Feb. 13, 1934 |
| 2,058,514 | Rust et al. | Oct. 27, 1936 |